United States Patent
Murofushi

(10) Patent No.: US 10,747,969 B2
(45) Date of Patent: Aug. 18, 2020

(54) ANTENNA DEVICE AND READING SYSTEM

(71) Applicant: TOSHIBA TEC KABUSHIKI KAISHA, Tokyo (JP)

(72) Inventor: Nobuo Murofushi, Susono Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/265,933

(22) Filed: Feb. 1, 2019

(65) Prior Publication Data
US 2019/0251305 A1  Aug. 15, 2019

(30) Foreign Application Priority Data
Feb. 13, 2018  (JP) .................... 2018-022792

(51) Int. Cl.
| | |
|---|---|
| G06K 7/10 | (2006.01) |
| H01Q 1/22 | (2006.01) |
| H01Q 1/10 | (2006.01) |
| H01Q 1/14 | (2006.01) |
| H01Q 19/10 | (2006.01) |
| G06K 19/07 | (2006.01) |

(52) U.S. Cl.
CPC ........... G06K 7/10297 (2013.01); H01Q 1/14 (2013.01); H01Q 1/2216 (2013.01); H01Q 19/106 (2013.01); *G06K 19/0723* (2013.01)

(58) Field of Classification Search
CPC ............ G06K 7/0004; G06K 7/10267; G06K 7/10316; G06K 7/10356; G06K 2007/10495; H01Q 1/2216; H01Q 21/061; H01Q 9/0428; H01Q 9/0435; H01Q 9/0464; H01Q 9/42; H01Q 1/2208; H01Q 1/243; H01Q 19/106
See application file for complete search history.

(56) References Cited

U.S. PATENT DOCUMENTS

| | | | | | |
|---|---|---|---|---|---|
| 6,056,199 | A | * | 5/2000 | Wiklof | G06K 17/0022 235/462.45 |
| 9,786,989 | B2 | * | 10/2017 | Horikoshi | H01Q 7/06 |
| 2006/0214774 | A1 | | 9/2006 | Mochida | |
| 2007/0040024 | A1 | * | 2/2007 | Murofushi | G06K 7/1094 235/383 |
| 2009/0102724 | A1 | * | 4/2009 | Tsutsumi | H01Q 1/2258 343/700 MS |
| 2013/0057449 | A1 | * | 3/2013 | Orihashi | H01Q 21/24 343/853 |
| 2017/0373373 | A1 | * | 12/2017 | Tsuchida | H01Q 21/061 |

(Continued)

OTHER PUBLICATIONS

Agneessens et al.: "Compact Half Diamond Dual-Band Textile HMSIW On-Body Antenna," IEEE Transactions on Antennas and Propagation, vol. 62, No. 5, Feb. 26, 2014, pp. 2374-2381.

(Continued)

*Primary Examiner* — Suezu Ellis
(74) *Attorney, Agent, or Firm* — Kim & Stewart LLP

(57) ABSTRACT

An antenna device of a reading apparatus configured to read a wireless tag includes a housing, an antenna element bent and extending in first and second directions within the housing, a first conductor that covers a bottom surface of the antenna element, and a second conductor that covers one or more of side surfaces of the antenna element on a major angle side thereof.

18 Claims, 6 Drawing Sheets

(56) References Cited

U.S. PATENT DOCUMENTS

2018/0060863 A1* 3/2018 Miryala ........... G06K 19/06028
2019/0081685 A1* 3/2019 Sano .................... H04B 7/0682

OTHER PUBLICATIONS

Kumar et al.: "Broadband Dual Circularly Polarized Substrate Integrated Waveguide Antenna," IEEE Antennas and Wireless Propagation Letters, vol. 16, Sep. 26, 2017, pp. 2971-2974.
Pflaum et al.: "Planar inverted F antenna circularly polarized for RFID applications," Antennas and Propagation Society International Symposium (APSURSI), 2012 IEEE, Jul. 8, 2012, pp. 1-2.
Extended European Search Report dated Jul. 9, 2019 in corresponding European Patent Application No. 19156872.4, 9 pages.

* cited by examiner

ANTENNA DEVICE AND READING SYSTEM

CROSS-REFERENCE TO RELATED APPLICATION

This application is based upon and claims the benefit of priority from Japanese Patent Application No. 2018-022792, filed on Feb. 13, 2018, the entire contents of which are incorporated herein by reference.

FIELD

Embodiments described herein relate generally to an antenna device and a reading system.

BACKGROUND

In the related art, there is known a wireless tag reading apparatus that reads and writes information from and into a wireless tag, such as a radio frequency identification (RFID) tag, an electronic tag, and a transponder.

For example, the wireless tag is embedded in a portable article, such as a card and a smartphone. When such an article is held over an antenna of the reading apparatus, a connection is established and information is exchanged therebetween.

However, since a human hand is a dielectric, when the hand is brought close to the antenna, the radiation of the radio waves from the reader is hindered, which results in failure of connection. Thus, a technique of reducing such deterioration is desired.

DETAILED DESCRIPTION

One or more embodiments provide an antenna device and a reading system capable of reducing deterioration of radiation characteristics of radio waves.

According to one embodiment, there is provided an antenna device of a reading apparatus configured to read a wireless tag. The antenna device includes a housing, an antenna element bent and extending in first and second directions within the housing, a first conductor that covers a bottom surface of the antenna element, and a second conductor that covers one or more of side surfaces of the antenna element on a major angle side thereof.

Embodiments of an antenna device and a reading system will be described in detail below with reference to the accompanying drawings. The embodiments to be described below are directed to the antenna device and the reading system but are not limited to the described configuration, specifications, and the like thereof. The antenna and the reading system of one of the embodiments are applied to a point of sales (POS) terminal connected to an antenna that transmits and receives radio waves to and from a wireless tag at a store such as a supermarket and the like.

Figure 1:
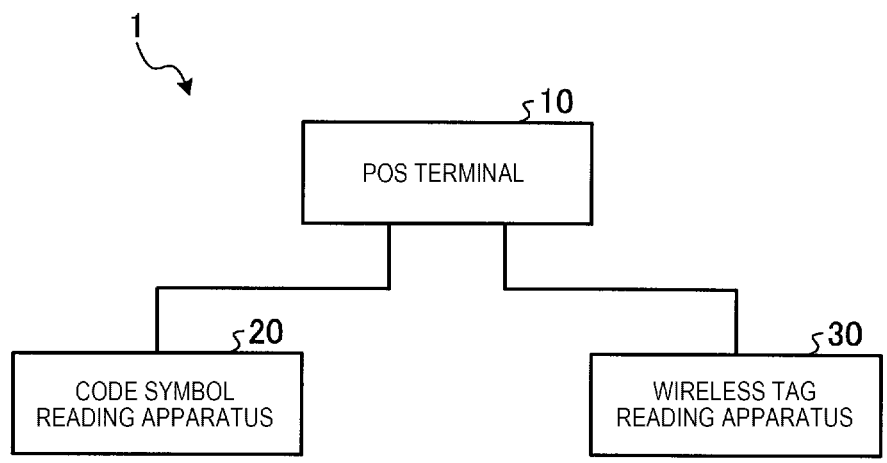
FIG. 1 is a diagram showing a reading system according to an embodiment.

FIG. 1 is a diagram showing a reading system 1 according to the present embodiment. The reading system 1 includes a POS terminal 10, a code symbol reading apparatus 20, and a wireless tag reading apparatus 30. The POS terminal 10 is communicably connected to the code symbol reading apparatus 20 and the wireless tag reading apparatus 30. The reading system 1 reads a code symbol 41 included in an article 4 or a wireless tag 42 included in an article 4 by each apparatus.

The POS terminal 10 is an information processing apparatus that executes sales registration for registering commodities to be sold and checkout processing of commodities registered through sales registration. In addition, the POS terminal 10 requests the code symbol reading apparatus 20 and the wireless tag reading apparatus 30 to execute reading processing of a reading target. Then, the POS terminal 10 receives the execution result of the reading processing from the code symbol reading apparatus 20 and the wireless tag reading apparatus 30.

The code symbol reading apparatus 20 is a reading apparatus that reads the code symbol 41 such as a bar code, a two-dimensional code, and the like. The code symbol reading apparatus 20 reads the code symbol 41 with reflected light by, for example, radiating a laser beam. The code symbol reading apparatus 20 executes reading processing when receiving a request to execute reading processing from the POS terminal 10. Then, the code symbol reading apparatus 20 transmits the reading result by the reading processing to the POS terminal 10.

The wireless tag reading apparatus 30 is a reading apparatus that executes reading and writing of various kinds of information to and from the wireless tag 42 by executing wireless communication with the wireless tag 42 called a radio frequency identification (RFID) tag, an electronic tag, or a responder. When the wireless tag reading apparatus 30 receives a request to execute the reading processing from the POS terminal 10, the wireless tag reading apparatus 30 transmits a radio wave for reading the wireless tag 42. In addition, the wireless tag reading apparatus 30 receives various kinds of information stored in the wireless tag 42 from the wireless tag 42. In this manner, the wireless tag reading apparatus 30 executes the reading processing. Then, the wireless tag reading apparatus 30 transmits the reading result by the reading processing to the POS terminal 10.

Figure 2:
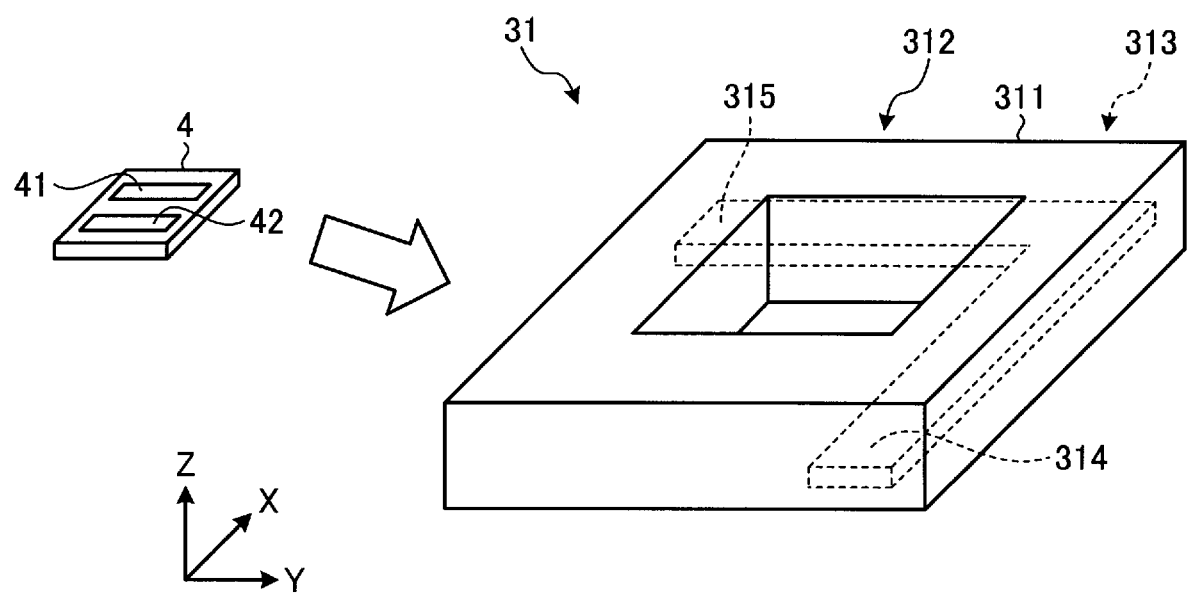
FIG. 2 is a perspective view of an antenna.

Next, an antenna 31 of the wireless tag reading apparatus 30 will be described. Here, FIG. 2 is a perspective view showing an example of the antenna 31.

The antenna 31 includes a rectangular housing 311 having a hollow portion 312. In the hollow portion 312, the code symbol reading apparatus 20 is disposed. The code symbol reading apparatus 20 radiates a laser beam for reading the code symbol 41, for example, toward the front surface or the left side surface in FIG. 2. In addition, the hollow portion 312 shown in FIG. 2 has a rectangular shape, but may have a circular shape or may have a shape conformed to the shape of the code symbol reading apparatus 20.

The antenna 31 includes an antenna element 313 branching into two directions inside the housing 311. The antenna element 313 is, for example, a substrate antenna formed on a substrate. Hereinafter, the antenna element 313 extending in an X direction shown in FIG. 2 will be referred to as a first antenna element 314. In addition, the antenna element 313 extending in a Y direction shown in FIG. 2 is referred to as a second antenna element 315.

In the present embodiment, the wireless tag reading apparatus 30 is disposed on the right front side of an operator as seen from the operator holding the wireless tag 42. Then, the operator holds the wireless tag 42 in his or her right hand and holds the wireless tag 42 over the antenna 31 from above. In this case, the operator holds the wireless tag 42 from the direction of the front side or the left side of the housing 311. Therefore, the wireless tag reading apparatus 30 reads the wireless tag 42 possessed by the hand entering from the direction of the front side or the left side of the housing 311.

Next, the antenna element 313 will be described in detail.

Figure 3:
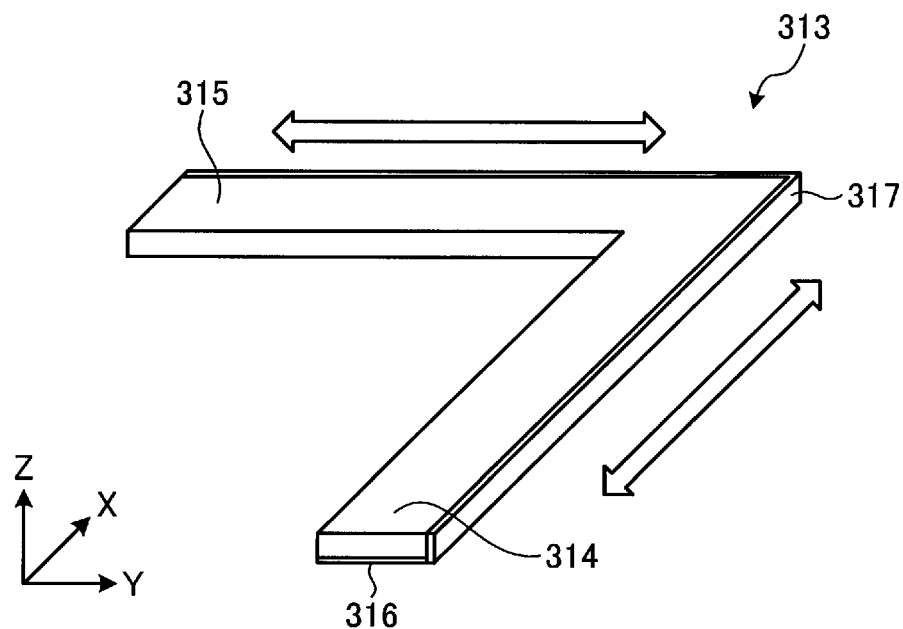
FIG. 3 is a diagram showing an example of a direction of a current flowing through a first antenna element and a second antenna element.
Figure 4:
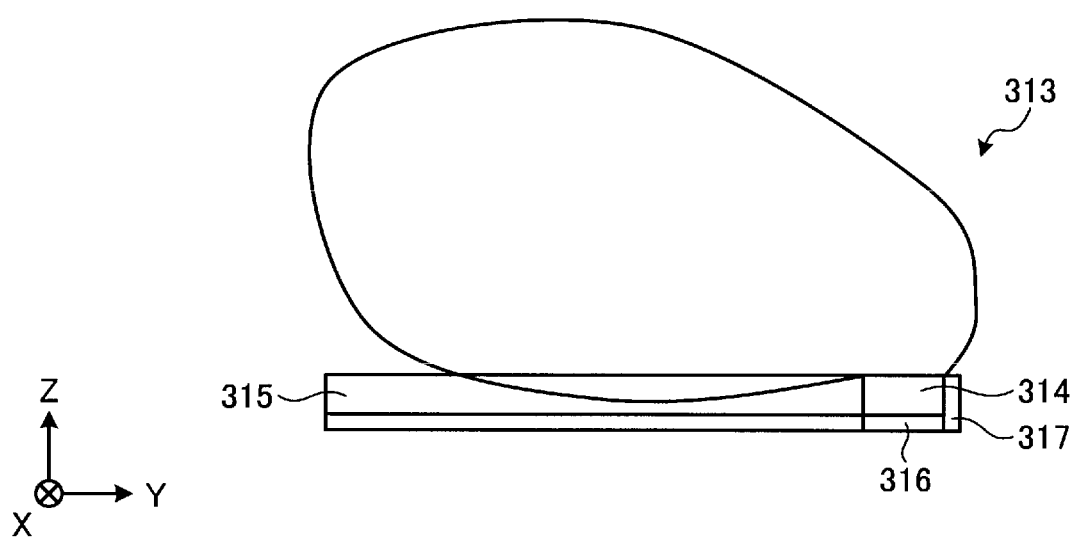
FIG. 4 is a front view showing an example of a reading area formed by the antenna.
Figure 5:
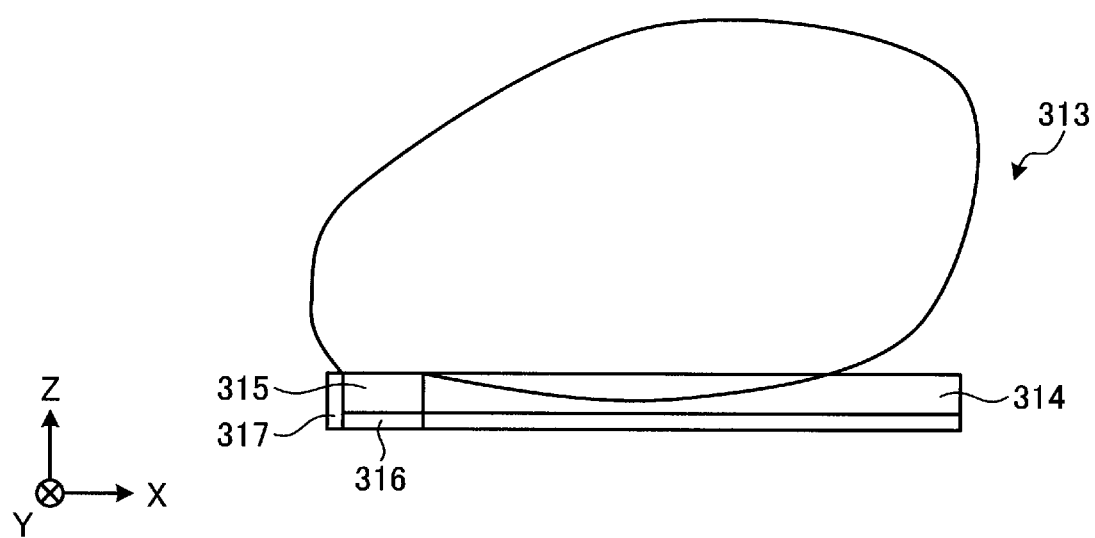
FIG. 5 is a left side view showing an example of a reading area formed by the antenna.

FIG. 3 is a diagram showing an example of a direction of a current flowing through the first antenna element 314 and the second antenna element 315. FIG. 4 is a front view for showing an example of a reading area formed by the antenna 31. FIG. 5 is a left side view showing an example of a reading area formed by the antenna 31.

The first antenna element 314 has a rectangular shape extending in the X direction. The second antenna element 315 has a rectangular shape extending in the Y direction. The first antenna element 314 and the second antenna element 315 form a conjugate angle at the ends of the antenna elements. More specifically, the first antenna element 314 and the second antenna element 315 are disposed so that the angle formed by the first and second antenna elements is a substantially right angle.

The bottom surface of the antenna element 313 is covered with a bottom surface conductor portion 316. In addition, in the antenna element 313, a part of the side surface of the antenna element 313 is covered with a side surface conductor portion 317. More specifically, among the common angles formed by the first antenna element 314 and the second antenna element 315, the side surface on the major angle side (i.e., side of the antenna element 313 where the angle formed by the first antenna element 314 and the second antenna element 315 is greater than 180 degrees) is covered with the side surface conductor portion 317. The bottom surface conductor portion 316 and the side surface conductor portion 317 are formed of a conductor such as a metal.

A high-frequency signal current flows through the first antenna element 314 in the X direction, that is, in the longitudinal direction of the first antenna element 314. Therefore, the first antenna element 314 radiates a linearly polarized wave in a direction orthogonal to the direction in which the high-frequency signal current flows, that is, in the Y direction. In addition, a high-frequency signal current flows through the second antenna element 315 in the Y direction, that is, in the longitudinal direction of the second antenna element 315. Therefore, the second antenna element 315 radiates a linearly polarized wave in a direction orthogonal to the direction in which the high-frequency signal current flows, that is, in the Y direction. That is, the first antenna element 314 and the second antenna element 315 radiate radio waves with a phase difference of 90 degrees.

In addition, the bottom surface of the antenna element 313 is covered with the bottom surface conductor portion 316, and the side surface on the major angle side is covered with the side surface conductor portion 317. The bottom surface conductor portion 316 and the side surface conductor portion 317 reflect radio waves radiated from the antenna element 313 so that radiation of radio waves in the direction of the bottom surface side and the direction of the major angle side is reduced and radio waves are strengthened in the upward and inferior side direction. As a result, as shown in FIG. 4, the first antenna element 314 radiates radio waves in the upward and inferior angle side direction to form a reading area of the wireless tag 42. Similarly, as shown in FIG. 5, the second antenna element 315 radiates radio waves in the upward and inferior angle side direction to forma reading area of the wireless tag 42. That is, the antenna element 313 may form a reading area in an area where the wireless tag 42 is supposed to be held.

Here, when linearly polarized waves are radiated from one direction, depending on the orientation of the antenna 421 (see FIG. 9) of the wireless tag 42, the wireless tag 42 may not communicate. However, the first antenna element 314 and the second antenna element 315 radiate linearly polarized waves so that the waves are substantially orthogonal to each other. Therefore, the first antenna element 314 and the second antenna element 315 may improve the communication accuracy.

In addition, the code symbol reading apparatus 20 is disposed in the hollow portion 312. That is, the code symbol reading apparatus 20 is disposed inside the vertex formed by the first antenna element 314 and the second antenna element 315. Then, the code symbol reading apparatus 20 radiates the laser light for reading the code symbol 41 toward the front surface, the left side surface, or the like in FIG. 2. In addition, the antenna element 313 forms a reading area in the areas shown in FIGS. 4 and 5. Therefore, since the reading area of the code symbol reading apparatus 20 and the reading area of the wireless tag reading apparatus 30 are overlapped, both the apparatuses may execute reading processing by holding the article 4 once.

Next, the hardware configuration of each apparatus included in the reading system 1 will be described.

Figure 6:
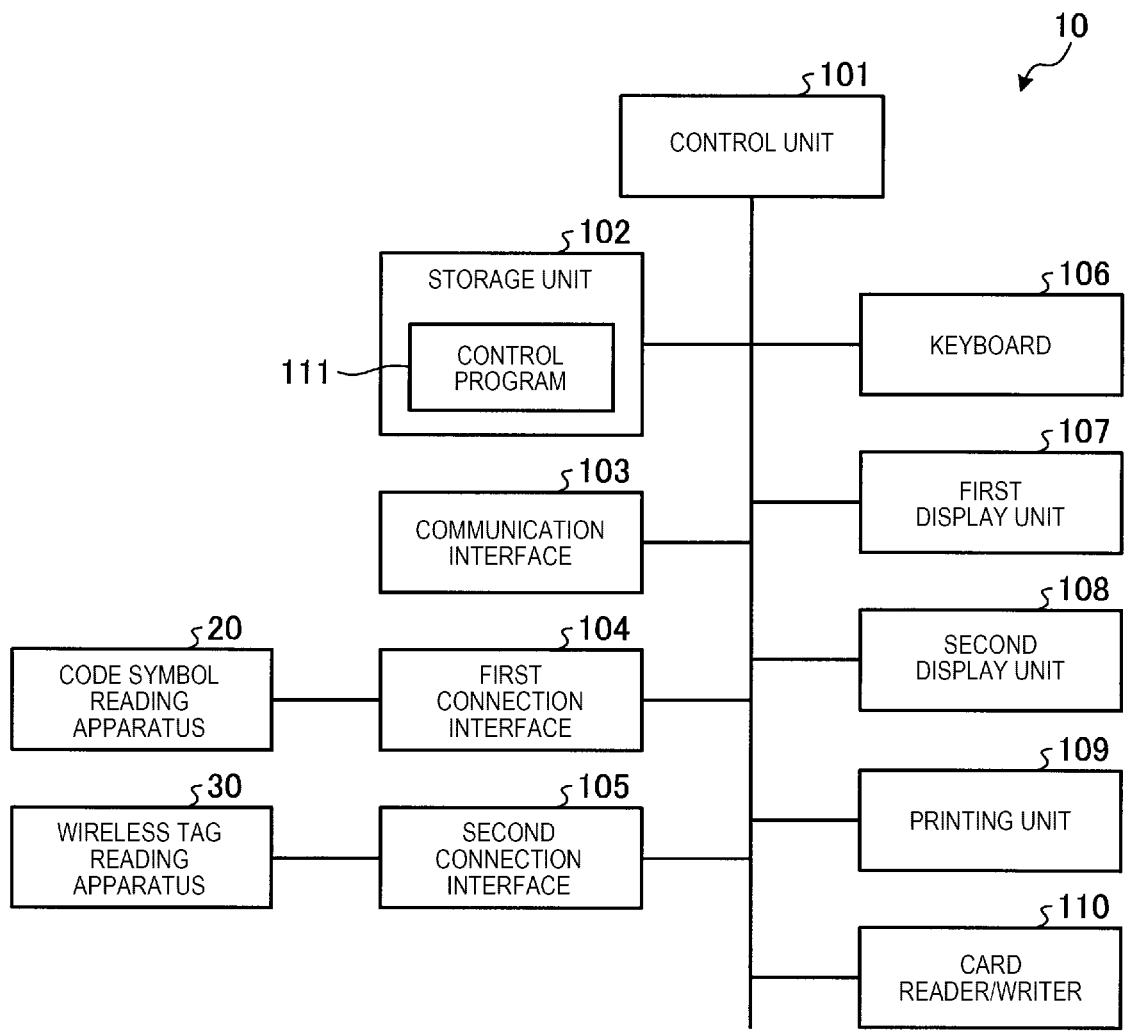
FIG. 6 is a block diagram showing an example of a hardware configuration of a POS terminal.

FIG. 6 is a block diagram showing an example of a hardware configuration of the POS terminal 10. The POS terminal 10 includes a control unit 101, a storage unit 102, a communication interface 103, a first connection interface 104, a second connection interface 105, a keyboard 106, a first display unit 107, a second display unit 108, a printing unit 109, and a card reader/writer 110.

The control unit 101 is a computer that controls the overall operation of the POS terminal 10 and performs various functions of the POS terminal 10. The control unit 101 includes a central processing unit (CPU), a read only memory (ROM), and a random access memory (RAM). The CPU comprehensively controls the operation of the POS terminal 10. The ROM is a storage medium that stores various programs and data. The RAM is a storage medium that temporarily stores various programs and various data. Then, the CPU executes a program stored in the ROM or the storage unit 102 or the like with the RAM as a work area.

The storage unit 102 is a storage device such as a hard disk drive (HDD) or a solid state drive (SSD). The storage unit 102 stores a control program 111. The control program 111 is a program for causing the operating system or the functions of the POS terminal 10 to be executed. The control program 111 includes a program for exercising the characteristic functions according to the present embodiment.

The communication interface 103 is an interface for communicating with various apparatus connected to the network.

The first connection interface 104 is an interface for communicating with the code symbol reading apparatus 20. The second connection interface 105 is an interface for communicating with the wireless tag reading apparatus 30.

The keyboard 106 includes various keys for operating the POS terminal 10.

The first display unit 107 is a liquid crystal display device or the like having a touch panel stacked on a display surface. For example, the first display unit 107 displays various screens to a clerk of the store. The second display unit 108 is a liquid crystal display apparatus or the like in which a touch panel is stacked on the display surface. For example, the second display unit 108 displays various screens for customers.

The printing unit 109 is a printer that prints a receipt or the like showing transaction details, point status, and the like on paper. The card reader/writer 110 is an apparatus that reads and writes information stored in a storage medium such as a magnetic material attached to a card.

Figure 7:
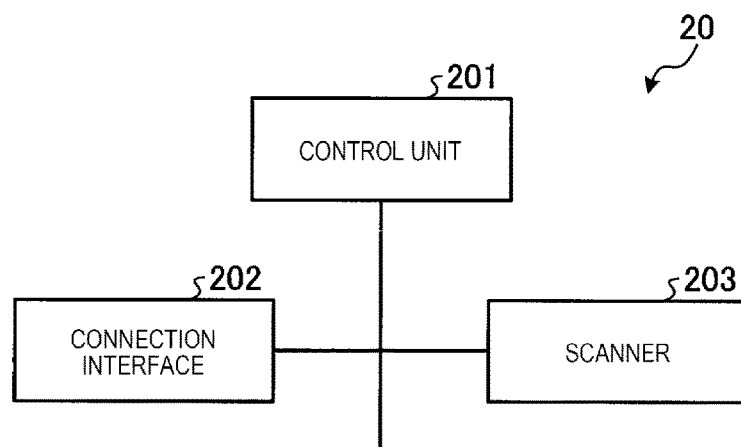
FIG. 7 is a block diagram showing an example of a hardware configuration of a code symbol reading apparatus.

FIG. 7 is a block diagram showing an example of a hardware configuration of the code symbol reading apparatus 20. The code symbol reading apparatus 20 includes a control unit 201, a connection interface 202, and a scanner 203.

The control unit 201 is a computer that controls the overall operation of the code symbol reading apparatus 20 and performs various functions of the code symbol reading apparatus 20. The control unit 201 includes a CPU, a ROM, and a RAM. The CPU comprehensively controls the operation of the code symbol reading apparatus 20. The ROM is a storage medium that stores various programs and data. The RAM is a storage medium that temporarily stores various programs and various data. Then, the CPU executes a program stored in a storage medium such as a ROM with the RAM as a work area.

The connection interface 202 is an interface for communicating with the POS terminal 10.

The scanner 203 radiates light and receives the reflected light. As a result, the scanner 203 reads the code symbol 41 or the like.

Figure 8:
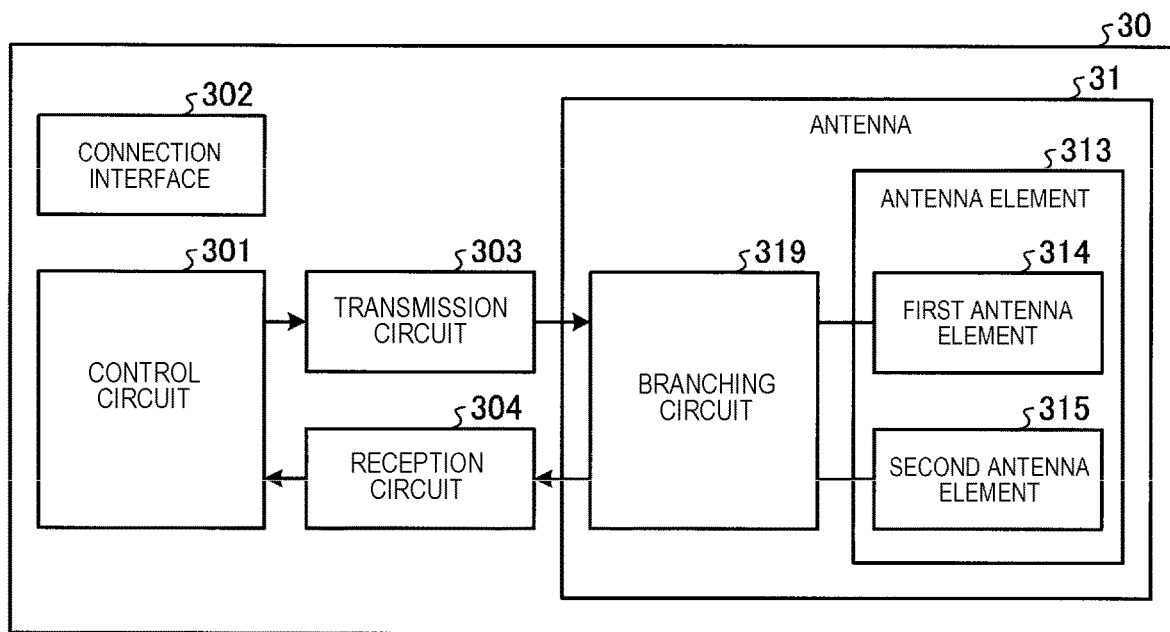
FIG. 8 is a block diagram showing an example of a hardware configuration of a wireless tag reading apparatus.

FIG. 8 is a block diagram showing an example of a hardware configuration of the wireless tag reading apparatus 30. The wireless tag reading apparatus 30 includes a control circuit 301, a connection interface 302, a transmission circuit 303, a reception circuit 304, and an antenna 31. Further, the antenna 31 includes a first antenna element 314, a second antenna element 315, and a branching circuit 319.

The control circuit 301 is a computer that controls the overall operation of the wireless tag reading apparatus 30 and performs various functions of the wireless tag reading apparatus 30. The control circuit 301 includes a CPU, a ROM, and a RAM. The CPU comprehensively controls the operation of the wireless tag reading apparatus 30. The ROM is a storage medium that stores various programs and data. The RAM is a storage medium that temporarily stores various programs and various data. Then, the CPU executes a program stored in a storage medium such as a ROM with the RAM as a work area.

The connection interface 302 is an interface for communicating with the POS terminal 10.

The transmission circuit 303 includes an encoding circuit, a modulation circuit, a filter circuit, and an amplifier circuit. The transmission circuit 303 converts the digital signals output from the control circuit by these circuits into high-frequency analog signals. Then, the transmission circuit 303 outputs a high-frequency analog signal.

The reception circuit 304 includes a demodulation circuit, a filter circuit, and a decoding circuit. The reception circuit 304 converts high-frequency analog signals output from the first antenna element 314 or the second antenna element 315 by these circuits into digital signals. Then, the reception circuit 304 outputs digital signals.

The branching circuit 319 is an electronic circuit that outputs a high-frequency analog signal in each direction branched into two directions, that is, the first antenna element 314 and the second antenna element 315. More specifically, the branching circuit 319 outputs the high-frequency analog signal input from the transmission circuit 303 to the first antenna element 314 and the second antenna element 315. In addition, the branching circuit 319 outputs the high-frequency analog signal input from the first antenna element 314 and the second antenna element 315 to the reception circuit 304.

Figure 9:
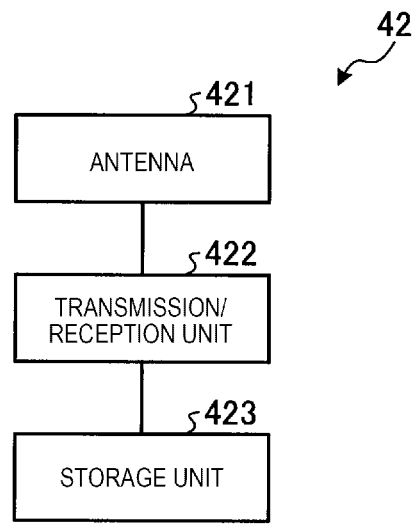
FIG. 9 is a block diagram showing an example of a hardware configuration of a wireless tag.

FIG. 9 is a block diagram showing an example of a hardware configuration of the wireless tag 42. The wireless tag 42 includes an antenna 421, a transmission/reception circuit 422, and a storage unit 423.

The antenna 421 transmits and receives radio waves and the like.

The transmission/reception circuit 422 generates electric power by electromagnetic induction or the like by using radio waves received by the antenna 421. Then, the transmission/reception circuit 422 executes reading processing and writing processing by using the generated power.

In addition, when the antenna 421 receives a radio wave for reading the information stored in the wireless tag 42, the transmission/reception circuit 422 causes the information of the storage unit 423 to be transmitted to the antenna 421. When the antenna 421 receives a radio wave for writing information to the wireless tag 42, the transmission/reception circuit 422 writes the information included in the received radio wave into the storage unit 423.

The storage unit 423 is a nonvolatile rewritable storage medium that may store information even when power is not supplied. The storage unit 423 stores, for example, an identification code identifying the wireless tag 42. The storage unit 423 may store any information instead of or in addition to the identification code.

Next, the functions of the respective apparatuses included in the reading system 1 will be described. Here, FIG. 10 is a block diagram showing an example of the functional configuration of each apparatus of the reading system 1.

Figure 10:
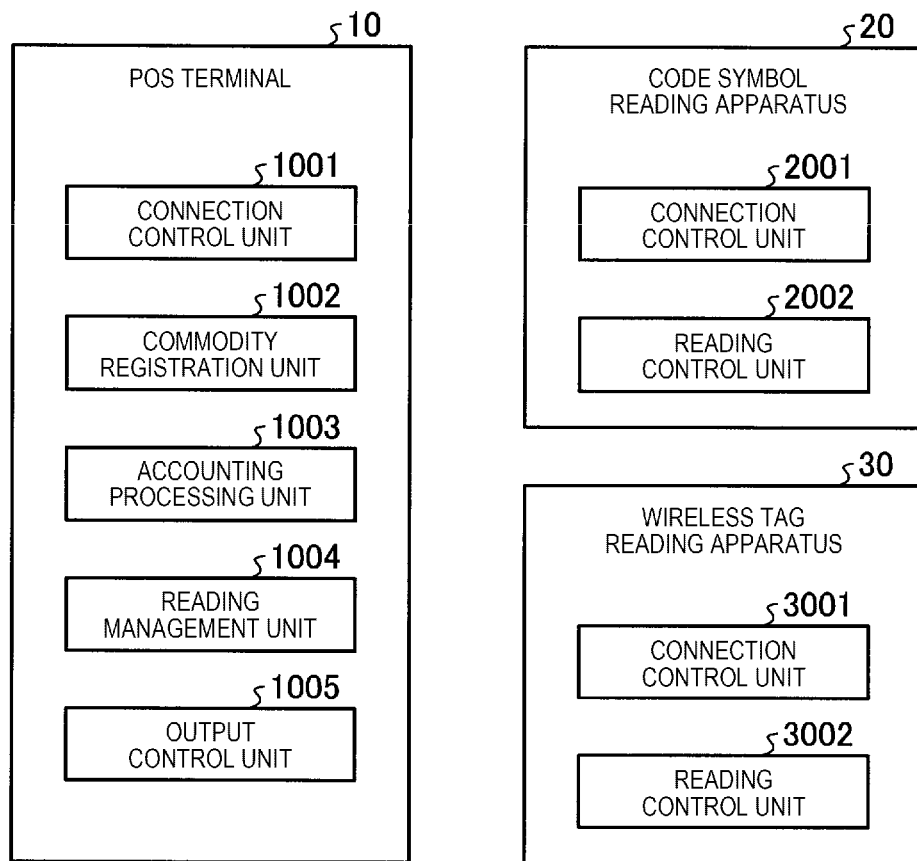
FIG. 10 is a block diagram showing an example of a functional configuration of each apparatus included in the reading system.

The control unit 101 of the POS terminal 10 loads the control program 111 stored in the storage unit 102 onto the RAM and operates according to the control program 111 to generate respective functional units shown in FIG. 10 on the RAM. Specifically, the control unit 101 of the POS terminal 10 includes a connection control unit 1001, a commodity registration unit 1002, a checkout processing unit 1003, a reading management unit 1004, and an output control unit 1005 as functional units.

The connection control unit 1001 controls the first connection interface 104 to execute communication with the code symbol reading apparatus 20. In addition, the connection control unit 1001 controls the second connection interface 105 to execute communication with the wireless tag reading apparatus 30.

The commodity registration unit 1002 controls sales registration of commodities to be sold. When a commodity code identifying a commodity is input, the commodity registration unit 1002 registers the commodity specified by the commodity code.

The checkout processing unit 1003 controls the checkout processing of the commodities registered by the commodity registration unit 1002. For example, the checkout processing unit 1003 calculates the total price of commodities registered by the commodity registration unit 1002. In addition, the checkout processing unit 1003 calculates the change by subtracting the total price from the amount received from a customer.

The reading management unit 1004 controls reading processing by the code symbol reading apparatus 20 and the wireless tag reading apparatus 30. For example, when receiving an operation or the like to start the reading processing, the reading management unit 1004 causes the connection control unit 1001 to transmit a read start request for requesting the start of reading processing. The reading management unit 1004 may cause the reading apparatus of both the code symbol reading apparatus 20 and the wireless tag reading apparatus 30 to transmit read start requests at once or may cause the both the reading apparatuses to transmit a read start request separately. The reading management unit 1004 causes the connection control unit 1001 to transmit a read end request for requesting the end of the reading processing, for example, in the case of reading an operation of ending the reading processing or a reading result of the reading processing.

In addition, the reading management unit 1004 specifies the article 4 held over by using the reading result received by the connection control unit 1001. For example, the reading management unit 1004 specifies the article 4 held from the information included in the reading result of either one of the reading result of the code symbol reading apparatus 20 and the reading result of the wireless tag reading apparatus 30. In addition, the reading management unit 1004 may specify the article 4 held over on the condition that the same information is included in both the reading result of the code symbol reading apparatus 20 and the reading result of the wireless tag reading apparatus 30.

In addition, the reading management unit 1004 may specify that the article 4 is held over the composite result of the reading result of the code symbol reading apparatus 20 and the reading result of the wireless tag reading apparatus 30. For example, when the article 4 to be read is a coupon with time limit, the time limit may be specified by the reading result of the code symbol reading apparatus 20 and the type of the coupon may be specified by the reading result of the wireless tag reading apparatus 30.

The output control unit 1005 outputs the reading result. For example, the output control unit 1005 controls the first display unit 107 and the second display unit 108 to display and output the reading result. In addition, the output control unit 1005 controls the printing unit 109 to print out the reading result.

The control unit 201 of the code symbol reading apparatus 20 loads the program stored in the ROM onto the RAM and operates according to the program to generate the respective functional units shown in FIG. 10 on the RAM. Specifically, the control unit 201 of the code symbol reading apparatus 20 includes a connection control unit 2001 and a reading control unit 2002 as functional units.

The connection control unit 2001 controls the connection interface 202 to execute communication with the POS terminal 10.

The reading control unit 2002 controls the scanner 203 to execute reading processing. For example, the reading control unit 2002 starts reading processing when the connection control unit 2001 receives a read start request. When reading the code symbol 41, the reading control unit 2002 causes the connection control unit 2001 to transmit the reading result including the information included in the read code symbol 41. When the connection control unit 2001 receives the read end request, the reading control unit 2002 ends the reading processing.

The control circuit 301 of the wireless tag reading apparatus 30 loads the program stored in the ROM onto the RAM and operates according to the program to generate the respective functional units shown in FIG. 10 on the RAM. Specifically, the control circuit 301 of the wireless tag reading apparatus 30 includes a connection control unit 3001 and a reading control unit 3002 as functional units.

The connection control unit 3001 controls the connection interface 302 to execute communication with the POS terminal 10.

The reading control unit 3002 controls the transmission circuit 303, the reception circuit 304, and the antenna 31 to execute reading processing. For example, the reading control unit 3002 starts reading processing when the connection control unit 3001 receives a read start request.

The reading control unit 3002 causes the connection control unit 3001 to transmit the reading result including the read information when the reading processing is ended. When the connection control unit 3001 receives the read end request, the reading control unit 3002 ends the reading processing.

As described above, according to the antenna 31 of the wireless tag reading apparatus 30 according to the present embodiment, the antenna element 313 extends in two directions and includes the first antenna element 314 and the second antenna element 315. That is, the antenna element 313 is not disposed in the vicinity where the operator holding the wireless tag 42 holds the wireless tag 42. Further, the bottom surface of the antenna element 313 is covered with the bottom surface conductor portion 316 formed of a conductor. In addition, a part of the side surface of the antenna element 313 is covered with the side surface conductor portion 317. Therefore, the antenna 31 forms a read area having high radio field intensity above the inner sides of the first antenna element 314 and the second antenna element 315. Therefore, the antenna 31 of the wireless tag reading apparatus 30 according to the present embodiment may reduce deterioration of the radiation characteristics of radio waves.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In addition, in the above embodiment, the case of the code symbol reading apparatus 20 has been described as an example of the second reading apparatus. However, the second reading apparatus is not limited to the code symbol reading apparatus 20, but may be another reading apparatus. For example, the second reading apparatus may be a reading apparatus that reads the wireless tag 42 corresponding to a frequency band different from that of the wireless tag reading apparatus 30 as the first reading apparatus.

In addition, in the above embodiment, the first antenna element 314 and the second antenna element 315 form a single structure of the antenna element 313. However, the first antenna element 314 and the second antenna element 315 may be separate antenna elements.

The programs to be executed by each device of the above embodiment or modification examples are assumed to be provided by being incorporated in advance in a storage medium (ROM or storage unit) included in each device, but are not limited thereto. For example, the programs may be configured to be recorded and provided in a computer-readable recording medium such as a CD-ROM, a flexible disk (FD), a CD-R, a digital versatile disk (DVD) or the like in a file in an installable format or an executable format. Further, the storage medium is not limited to a medium independent of a computer or an embedded system, but includes a storage medium in which a program transmitted by a LAN, the Internet, or the like is downloaded and stored or temporarily stored.

In addition, the programs to be executed by each device of the above embodiment or modification examples may be stored on a computer connected to a network such as the Internet and configured to be provided by being downloaded via the network, and configured to be provided or distributed via the network as the Internet.

What is claimed is:

1. An antenna device of a reading apparatus configured to read a wireless tag, the device comprising:
   a rectangular housing having first, second, third, and fourth sections, the first and third sections extending in a first direction and second and fourth sections extending in a second direction that crosses the first direction;
   an antenna element that is bent along a length thereof to form a first portion extending in the first direction within the first section of the housing and a second portion extending in the second direction within the second section of the housing;
   a first conductor that covers a bottom surface of the antenna element; and
   a second conductor that covers a side surface of each of the first and second portions.

2. The device according to claim 1, wherein the antenna element is bent at a right angle.

3. The device according to claim 1, further comprising:
   a branching circuit, wherein
   the branching circuit is configured to output an analog signal to each of the first and second portions of the antenna element.

4. The device according to claim 3, wherein the branching circuit outputs the signal in response to a signal transmitted from a transmitter of the reading apparatus.

5. The device according to claim 3, wherein the branching circuit outputs a signal to a receiver of the reading apparatus when a signal from the wireless tag is received by the antenna element.

6. The device according to claim 1, wherein the antenna element is a substrate antenna formed on a substrate within the housing.

7. The device according to claim 1, wherein the housing has an opening partially surrounded by the antenna element.

8. The device according to claim 7, wherein the opening has a rectangular shape.

9. The device according to claim 1, wherein the wireless tag is a radio frequency identification (RFID) tag.

10. A reading system comprising:
    a first reading apparatus configured to read a symbol code by using a laser beam; and
    a second reading apparatus configured to read a wireless tag and comprising:
      a rectangular housing having first, second, third, and fourth sections, the first and third sections extending in a first direction and second and fourth sections extending in a second direction that crosses the first direction,
      an antenna element that is bent along a length thereof to form a first portion extending in the first direction within the first section of the housing and a second portion extending in the second direction within the second section of the housing,
      a first conductor that covers a bottom surface of the antenna element, and
      a second conductor that covers a side surface of each of the first and second portions.

11. The system according to claim 10, wherein the housing of the second reading apparatus has an opening, and the first reading apparatus is located in the opening.

12. The system according to claim 10, wherein the antenna element is bent at a right angle.

13. The system according to claim 10, wherein the second reading apparatus comprises a branching circuit, and the branching circuit is configured to output an analog signal to each of the first and second portions of the antenna element.

14. The system according to claim 13, wherein the second reading apparatus comprises a transmitter, and the branching circuit outputs the signal in response to a signal transmitted from the transmitter.

15. The system according to claim 14, wherein the second reading apparatus comprises a receiver, and the branching circuit outputs a signal to the receiver when a signal from the wireless tag is received by the antenna element.

16. The system according to claim 10, wherein the antenna element is a substrate antenna formed on a substrate within the housing.

17. The system according to claim 10, wherein the housing has an opening partially surrounded by the antenna element.

18. The system according to claim 10, wherein the symbol code and the wireless tag are printed and attached to an article sold in a grocery store.

* * * * *